United States Patent
Sacha et al.

(10) Patent No.: US 9,161,139 B2
(45) Date of Patent: Oct. 13, 2015

(54) METHOD AND APPARATUS FOR DETECTING CELLULAR TELEPHONES FOR HEARING ASSISTANCE DEVICES

(71) Applicant: Starkey Laboratories, Inc., Eden Prairie, MN (US)

(72) Inventors: Michael Karl Sacha, Chanhassen, MN (US); Yezihalem Mesfin, Eden Prairie, MN (US); Jay Rabel, Shorewood, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 14/022,566

(22) Filed: Sep. 10, 2013

(65) Prior Publication Data

US 2014/0198937 A1   Jul. 17, 2014

Related U.S. Application Data

(63) Continuation of application No. 12/776,038, filed on May 7, 2010, now Pat. No. 8,559,663.

(60) Provisional application No. 61/176,734, filed on May 8, 2009.

(51) Int. Cl.
*H04R 25/00* (2006.01)
*H04M 1/60* (2006.01)

(52) U.S. Cl.
CPC ............ *H04R 25/554* (2013.01); *H04M 1/6066* (2013.01); *H04R 25/43* (2013.01); *H04R 2225/55* (2013.01)

(58) Field of Classification Search
CPC .. H04R 25/43; H04R 25/554; H04R 2225/55; H04M 1/6066
USPC ........................................................ 381/315
See application file for complete search history.

(56) References Cited

U.S. PATENT DOCUMENTS 5,083,312 A   1/1992   Newton et al.
5,721,783 A   2/1998   Anderson
(Continued)

FOREIGN PATENT DOCUMENTS

EP   2012557 A2   1/2009
WO   WO-9641498 A1   12/1996
(Continued)

OTHER PUBLICATIONS

"U.S. Appl. No. 12/776,038, Non Final Office Action mailed Sep. 27, 2012", 9 pgs.
(Continued)

*Primary Examiner* — Jianchun Qin
(74) *Attorney, Agent, or Firm* — Schwegman Lundberg & Woessner, P.A.

(57) ABSTRACT

The present subject matter relates generally to methods and apparatus for detecting cellular telephones using hearing assistance devices. In an embodiment, a hearing assistance device includes a processor and a radio frequency transceiver connected to the processor. A detection circuit is connected to the processor, the detection circuit including a band pass filter and where the detection circuit is adapted to monitor a radio frequency signal to detect a cellular telephone in proximity to the hearing assistance device based on the monitored signal. The hearing assistance device includes an acoustic input, a magnetic input, and a switch for selecting between the acoustic input and the magnetic input. The processor is adapted to actuate the switch from the acoustic input to the magnetic input when a cellular telephone is detected in proximity to the hearing assistance device.

26 Claims, 10 Drawing Sheets

(56) References Cited

U.S. PATENT DOCUMENTS

| | | | |
|---|---|---|---|
| 5,768,397 | A | 6/1998 | Fazio |
| 6,021,207 | A | 2/2000 | Puthuff et al. |
| 6,438,245 | B1 | 8/2002 | Taenzer et al. |
| 7,702,121 | B2 | 4/2010 | Husung et al. |
| 8,280,086 | B2 | 10/2012 | Topholm |
| 8,559,663 | B1 | 10/2013 | Sacha et al. |
| 8,891,793 | B1 | 11/2014 | Sacha et al. |
| 2003/0076974 | A1* | 4/2003 | Barthel et al. ............... 381/312 |
| 2004/0234090 | A1 | 11/2004 | Berg |
| 2005/0058313 | A1 | 3/2005 | Victorian et al. |
| 2005/0111401 | A1 | 5/2005 | Terry |
| 2007/0009123 | A1 | 1/2007 | Aschoff et al. |
| 2007/0274550 | A1* | 11/2007 | Baechler et al. ............. 381/315 |
| 2008/0260180 | A1 | 10/2008 | Goldstein et al. |
| 2009/0010464 | A1 | 1/2009 | Kornagel |
| 2010/0057472 | A1* | 3/2010 | Zeng et al. .................... 704/500 |
| 2010/0195836 | A1 | 8/2010 | Platz |
| 2010/0208631 | A1 | 8/2010 | Zhang et al. |
| 2010/0246865 | A1 | 9/2010 | Suurballe |
| 2010/0246866 | A1 | 9/2010 | Swain et al. |
| 2010/0303268 | A1* | 12/2010 | Frerking et al. ............. 381/315 |
| 2011/0032071 | A1 | 2/2011 | Tondering |
| 2011/0249836 | A1 | 10/2011 | Solum et al. |
| 2011/0249837 | A1 | 10/2011 | Galster et al. |

FOREIGN PATENT DOCUMENTS

| | | | |
|---|---|---|---|
| WO | WO-9848526 | A2 | 10/1998 |
| WO | WO-2009076949 | A1 | 6/2009 |

OTHER PUBLICATIONS

"U.S. Appl. No. 12/776,038, Notice of Allowance mailed Jan. 18, 2013", 9 pgs.

"U.S. Appl. No. 12/776,038, Notice of Allowance mailed Jun. 10, 2013", 9 pgs.

"U.S. Appl. No. 12/776,038, Response filed Dec. 26, 2012 to Non Final Office Action mailed Sep. 27, 2012", 7 pgs.

"U.S. Appl. No. 12/823,505 , Response filed Apr. 23, 2013 to Non Final Office Action mailed Jan. 23, 2013", 12 pgs.

"U.S. Appl. No. 12/823,505, Advisory Action mailed Oct. 4, 2013", 3 pgs.

"U.S. Appl. No. 12/823,505, Final Office Action mailed Jul. 18, 2013", 9 pgs.

"U.S. Appl. No. 12/823,505, Non Final Office Action mailed Jan. 23, 2013", 11 pgs.

"U.S. Appl. No. 12/823,505, Non Final Office Action mailed Nov. 4, 2013", 9 pgs.

"U.S. Appl. No. 12/823,505, Response filed Sep. 4, 2013 to Restriction Requirement mailed Aug. 2, 2013", 6 pgs.

"U.S. Appl. No. 12/823,505, Response filed Sep. 18, 2013 to Final Office Action mailed Jul. 18, 2013", 8 pgs.

"U.S. Appl. No. 12/823,505, Response filed Dec. 19, 2012 to Restriction Requirement mailed Oct. 19, 2012", 6 pgs.

"U.S. Appl. No. 12/823,505, Restriction Requirement mailed Aug. 2, 2012", 6 pgs.

"U.S. Appl. No. 12/823,505, Restriction Requirement mailed Oct. 19, 2012", 6 pgs.

"U.S. Appl. No. 12/981,035, Advisory Action mailed Jul. 11, 2013", 3 pgs.

"U.S. Appl. No. 12/981,035, Final Office Action mailed Apr. 8, 2013", 17 pgs.

"U.S. Appl. No. 12/981,035, Non Final Office Action mailed Aug. 29, 2013", 17 pgs.

"U.S. Appl. No. 12/981,035, Non Final Office Action mailed Nov. 20, 2012", 16 pgs.

"U.S. Appl. No. 12/981,035, Response filed Feb. 20, 2013 to Non Final Office Action mailed Nov. 30, 2012", 7 pgs.

"U.S. Appl. No. 12/981,035, Response filed Jun. 10, 2013 to Final Office Action mailed Apr. 8, 2013", 7 pgs.

"European Application Serial No. 11250442.8, Extended European Search Report mailed Aug. 18, 2011", 6 pgs.

"European Application Serial No. 11250442.8, Response filed Apr. 17, 2012 to Extended Search Report mailed Aug. 18, 2011", 28 pgs.

"U.S. Appl. No. 12/823,505 , Response filed Feb. 4, 2014 to Non Final Office Action mailed Nov. 4, 2014", 8 pgs.

"U.S. Appl. No. 12/823,505, Final Office Action mailed Apr. 29, 2014", 11 pgs.

"U.S. Appl. No. 12/823,505, Notice of Allowance mailed Jul. 18, 2014", 9 pgs.

"U.S. Appl. No. 12/823,505, Response filed Jun. 30, 2014 to Final Office Action mailed Apr. 29, 2014", 8 pgs.

* cited by examiner

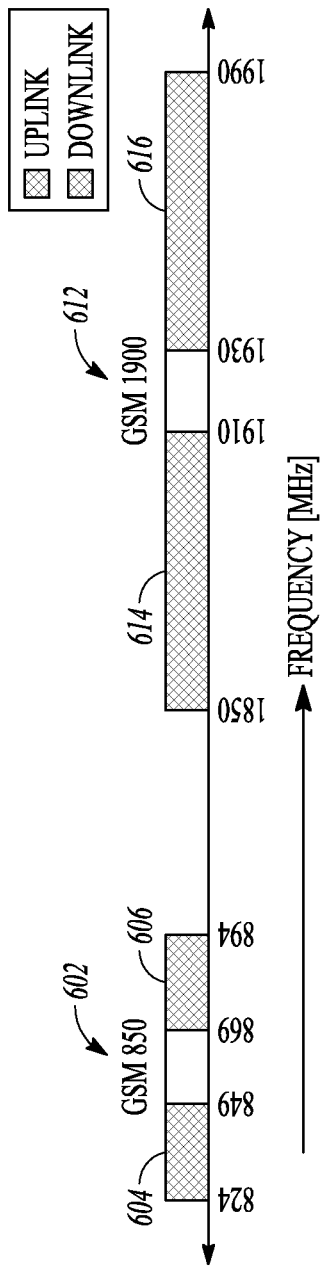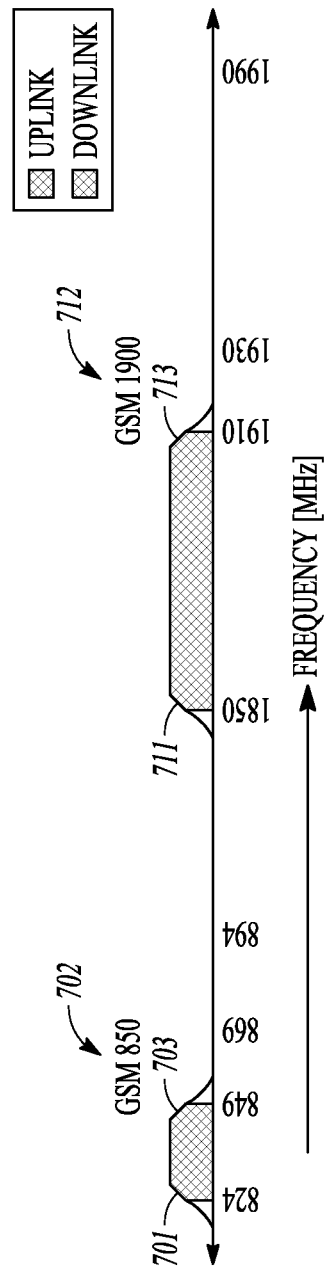

METHOD AND APPARATUS FOR DETECTING CELLULAR TELEPHONES FOR HEARING ASSISTANCE DEVICES

RELATED APPLICATIONS

This application is a continuation of U.S. patent application Ser. No. 12/776,038, filed May 7, 2010, now issued as U.S. Pat. No. 8,559,663, which application claims priority under 35 U.S.C 119(e) of U.S. Provisional Patent Application Ser. No. 61/176,734 filed on May 8, 2009, which applications are incorporated herein by reference in their entirety.

FIELD OF THE INVENTION

The present subject matter relates generally to hearing assistance devices, and in particular to methods and apparatus for detecting cellular telephones using hearing assistance devices.

BACKGROUND

Hearing assistance devices come in a variety of devices including but not limited to assistive listening devices, cochlear implants and hearing aids. Hearing assistance devices are useful in improving the hearing and speech comprehension of people who have hearing loss by selectively amplifying certain frequencies according to the hearing loss of the subject. A hearing aid typically has three basic parts; a microphone, amplifier and a speaker. The microphone receives sound (acoustic signal) and converts it to an electrical signal and sends it to an amplifier. The amplifier increases the power of the signal, in proportion to the hearing loss, and then sends it to the ear through the speaker. Cochlear devices may employ electrodes to transmit sound to the patient.

When the hearing loss is severe and a significant amplification is needed from the hearing aid's amplifier, acoustic feedback becomes an issue. Acoustic feed back occurs when there is a feed back loop from the microphone to the receiver (speaker) of the hearing aid which leads to a howling sound produced by the hearing assistance device. This feedback is both annoying and reduces the maximum usable gain of the hearing aid.

Acoustic feedback is a primary obstacle to a normal use of a telephone with hearing aids. The presence of a handset with in few millimeters of the hearing aid's microphone reflects amplified sound leaking from the ear canal back through the hearing aid. As the hand set approaches the hearing aid, the frequency and intensity of the reflected signal increases to the point where the hearing aid becomes unstable and components begin to ring.

To solve this feedback problem with telephone use, modern hearing aids have an additional component, a telecoil, to pick up the signal from the headset magnetically. When a hearing aid has a telecoil, it has two modes of operation; acoustic and magnetic. Switching between these two modes can be done manually, by pressing a mode switch, or in some hearing aids it is done automatically, by incorporating a magnetically-activated switch. In the later case, the sensor senses the magnetic field of the handset's biasing magnet and switches the mode to telecoil-mode.

While this solution solves the problem with land-line phones which are compatible with hearing assistance devices, the magnetic field generated by the cell phone's speaker is not strong enough to trigger the magnetic-activated switch in the hearing assistance devices. Thus, there is a need in the art for an improved method and apparatus for detecting cellular telephones using hearing assistance devices.

SUMMARY

Disclosed herein, among other things, are methods and apparatus for detecting cellular telephones using hearing assistance devices. In an embodiment, a hearing assistance device includes a processor and a radio frequency transceiver connected to the processor. A detection circuit is connected to the processor, the detection circuit including a band pass filter and where the detection circuit is adapted to monitor a radio frequency signal to detect a cellular telephone in proximity to the hearing assistance device based on the monitored signal. In various embodiments, the hearing assistance device includes an acoustic input, a magnetic input, and a switch for selecting between the acoustic input and the magnetic input. The processor is adapted to actuate the switch from the acoustic input to the magnetic input when a cellular telephone is detected in proximity to the hearing assistance device.

One embodiment of the present subject matter is a method including monitoring a radio frequency signal using an electronic circuit in a hearing assistance device, and detecting a cellular telephone in proximity to the hearing assistance device based on the monitored signal. The hearing assistance device is switched from an acoustic mode of operation to a magnetic mode of operation when the cellular telephone is detected in proximity to the hearing assistance device.

Another embodiment of the present subject matter is a method for using an electronic circuit in a hearing assistance device to detect a cellular telephone in proximity to the hearing assistance device, the cellular telephone in communication with a base station. The method includes monitoring signal strength in a downlink bandwidth of the cellular telephone using the electronic circuit to determine the signal strength of the base station. A power detect level is set based on the signal strength of the base station. Signal strength in an uplink bandwidth of the cellular telephone is monitored using the electronic circuit, and the cellular telephone is detected in proximity to the hearing assistance device when the signal strength in the uplink bandwidth meets or exceeds the power detect level.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

BRIEF DESCRIPTION OF THE DRAWINGS

FIG. 6 shows a graphical representation of a frequency allocation for GSM (Global System for Mobile communication) 850 and GSM 1900 cellular telephone communication systems.

FIG. 7 illustrates a graphical representation of filtering the uplink frequency of GSM 850 and GSM 1900 cellular telephone communications, according to various embodiments of the present subject matter.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter relates generally to methods and apparatus for detecting cellular telephones using hearing assistance devices, including but not limited to assistive listening devices, cochlear implants and hearing assistance devices. In an embodiment, a hearing assistance device includes a processor and a radio frequency (RF) transceiver connected to the processor. As used herein, a processor includes but is not limited to, a digital signal processor (DSP), a microprocessor, a microcontroller, or any other processing hardware. An electronic circuit is incorporated into the hearing assistance device and connected to the processor, to enable the hearing assistance device to detect an RF signal from a cell phone that is brought close to it. Once the circuit detects the cell phone, the processor switches the hearing assistance device's mode of operation from acoustic to magnetic mode so that the hearing assistance device picks up the signal magnetically, instead of acoustically. By doing so, the person wearing the hearing assistance device enjoys the cellular telephone conversation without experiencing acoustic feedback and competing environmental sound.

Cellular Telephone System

Cellular telephones (or cell phones) originated from the radio, and evolved into the telephone. Many different types of systems have provided city-wide two-way communications, such as radio systems for taxis or the police. In these systems, a single antenna is located near the center of the city and to cover the entire city, the antenna is placed on a tall building and emits a very strong signal.

Figure 1:
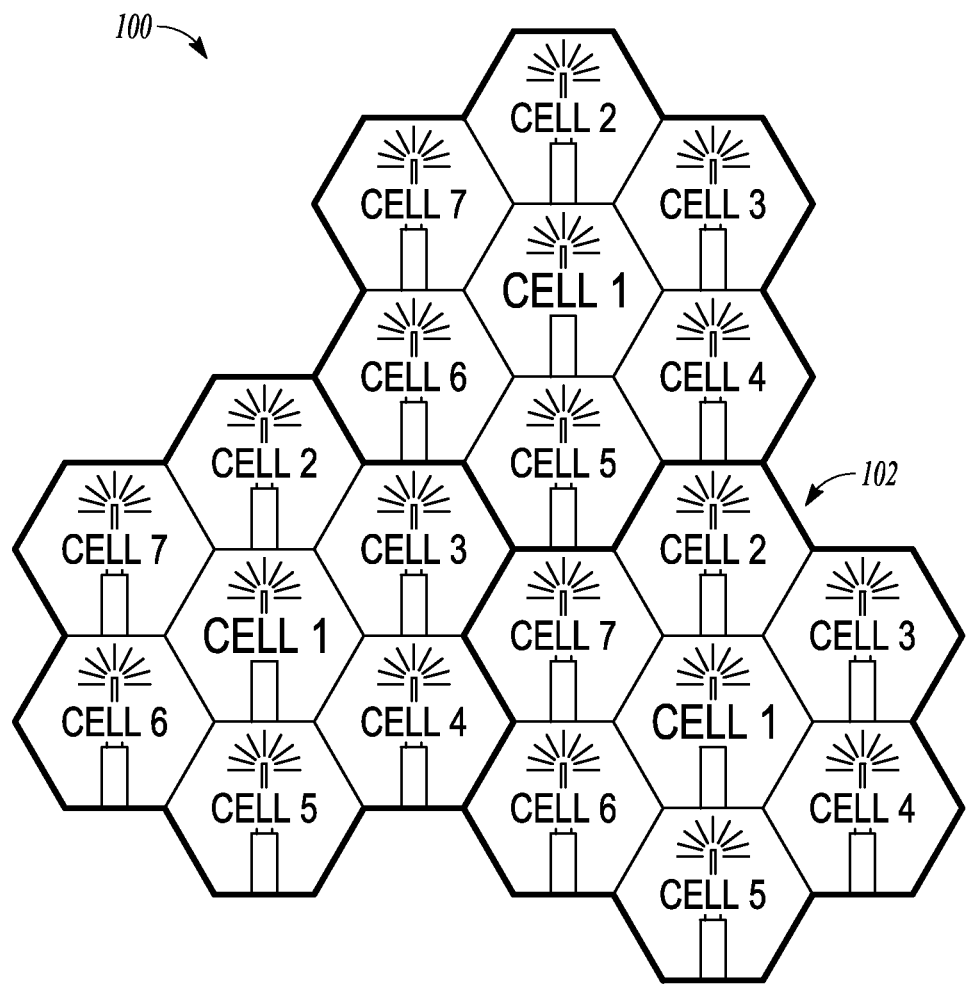
FIG. 1 shows a cellular telephone system having a plurality of cells.

In the cellular phone system, however, the city is divided into smaller sections, or cells. FIG. 1 shows a cellular telephone system 100 having a plurality of cells. Each cell 102 has a hexagonal shape and contains its own antenna in the center (base station) and uses only a subset of all the channels. Each antenna is lower in height and emits a much weaker signal so that the same subset of channels can be used in a cell somewhere else within the city. For example, within a typical cellular system, every seventh cell uses the same set of channels.

Every carrier within a city uses the same central office, the Mobile Telephone Switching Office (MTSO). A cell phone carrier is usually allowed about 832 radio frequencies to use per city. With the analog system, one cell phone uses 2 frequencies per phone call, but each cell has about 56 voice channels available which mean that 56 cell phones can be in use at one time. But, with digital cellular systems the available channels can be used more efficiently by using different multiplexing techniques.

Channel Multiplexing

Multiplexing is the process where multiple channels are combined for transmission over a common transmission path. One of the basic concepts in data communication is the idea of allowing several transmitters to send information simultaneously over a single communication channel. This allows several users to share a bandwidth of frequencies.

Channel Multiplexing Techniques

FDMA—(Frequency Division Multiple Access)

Figure 2:
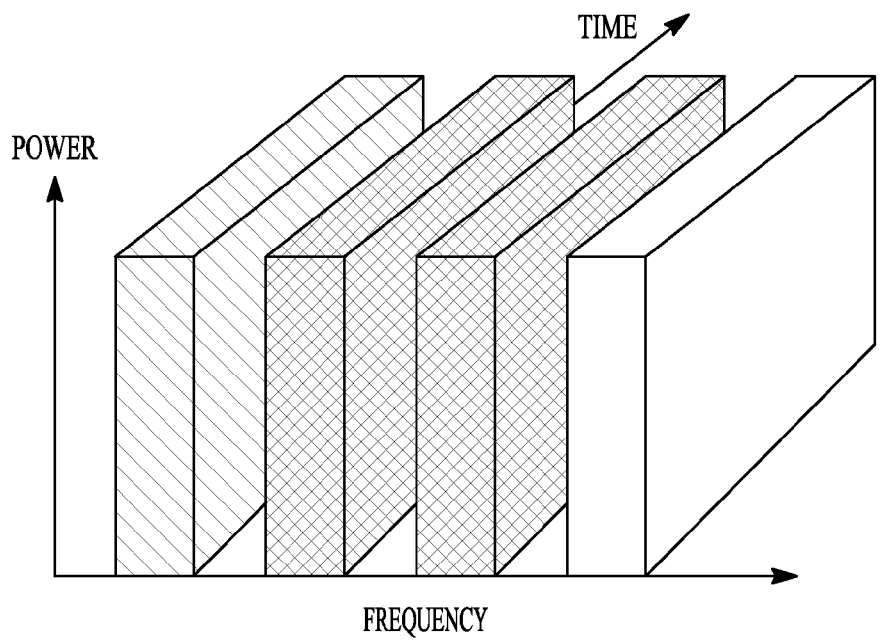
FIG. 2 shows a graphical representation of a FDMA (frequency division multiple access) communication system.

In FDMA, multiple channels are combined onto a single aggregate signal for transmission. FIG. 2 shows a graphical representation of a FDMA communication system. The channels are separated in the aggregate by their FREQUENCY.

TDMA—(Time Division Multiple Access)

Figure 3:
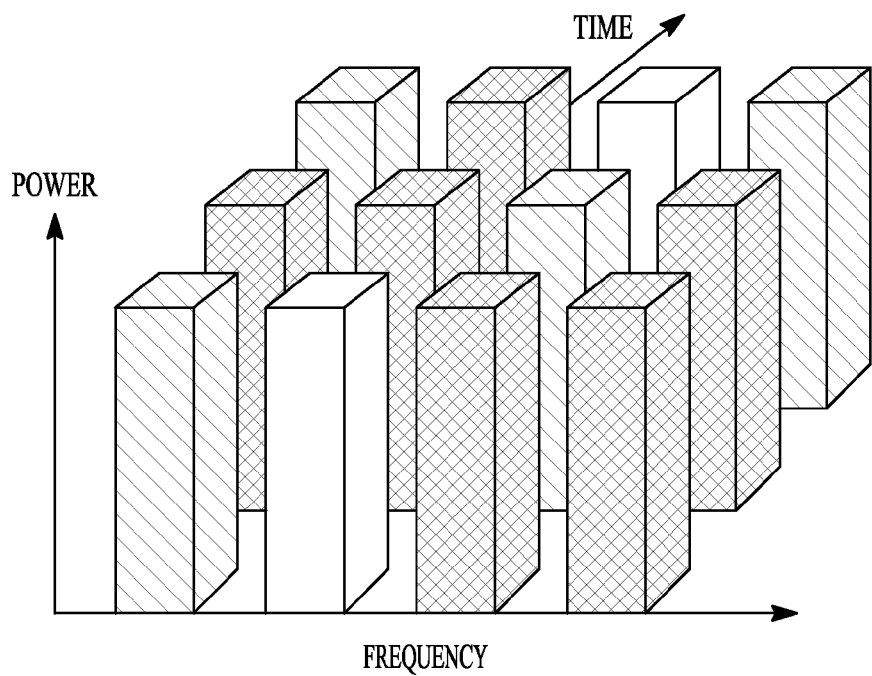
FIG. 3 shows a graphical representation of a TDMA (time division multiple access) communication system.

TDMA allocates a single frequency channel for a short time and then moves to another channel. FIG. 3 shows a graphical representation of a TDMA communication system. The digital samples from a single transmitter occupy different time slots in several bands at the same time as shown below. The access technique used in TDMA has three users sharing a 30-KHz carrier frequency.

IS-54 (IS136) Protocol Specification

30 KHz, 6 slots per frame, each user 2 slots, 40 msec frame

Some time offset between reverse and forward to not transmit and receive at same time, still do full duplex 324 bits per slot, 6 slots/frame, in 40 msec=48.6 kbps Full rate channel is 2 slots/frame=16.2 kbps; also half rate, 2×, 3×

No fixed assignment of frequencies to control channels

Figure 5:
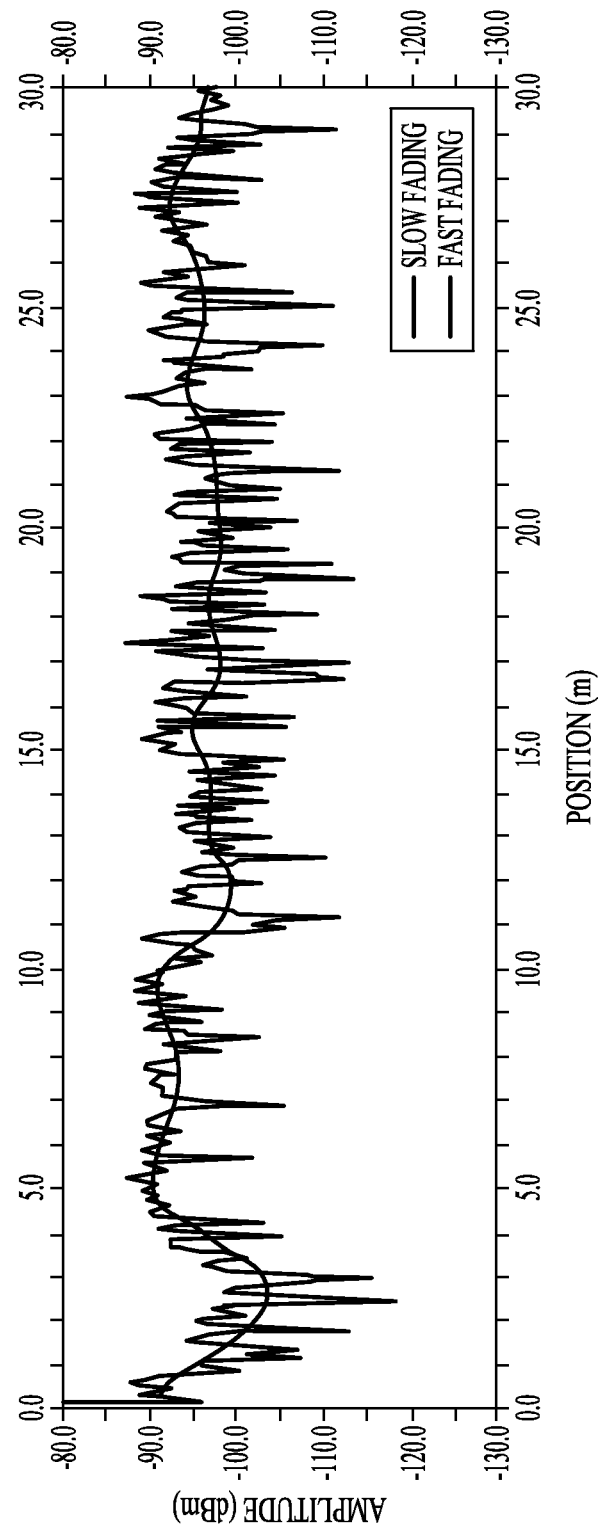
FIG. 5 shows a graphical representation of a channel fading in a communication system.

Uses DQPSK with possible 45 degree, 45+90, 45+180 and −45 degree shifts from each phase angle, so 4 possible next symbols, so 2 bits each, called pi/4 shifted DQPSK—a 1.62 bps/Hz modulation spectral efficiency FIG. 5.4—also, differential, no absolute phase reference or detector needed But not very energy efficient—BER for given Eb/Nsub0 not great, reuse still 7

Mobile transmits 0.25 mw up to 4 w, in 4 dB steps, but only ⅓ the time

Spectral efficiency: in terms of voice calls:

About 3 times better than AMPS (a bit higher, if it uses 21 control channels for one provider in 25 MHz, instead of 6 time slots.

6 time slots (interleaving of 2 voice samples).

3 users/frame 324 bits/time slot 6.67 ms/slot

GSM—(Global System for Mobile Communication)

GSM is a digital mobile telephone system that is widely used in Europe and other parts of the world. GSM uses a variation of time division multiple access (TDMA) and is the most widely used of the three digital wireless telephone technologies (TDMA, GSM, and CDMA). GSM digitizes and compresses data, then sends it down a channel with two other streams of user data, each in its own time slot. It operates at either the 850 MHz or 1900 MHz frequency band in the US and 900 MHz or 1800 MHz frequency band in Europe.

A GSM Multiframe is the basic unit, and is 120 ms long. There are 26 Frames in each Multiframe, with each Frame being 4.61538 ms long (120 ms/26). Within each Frame are 8 Timeslots at 576.92 us per Timeslot (577 us in round numbers). Finally, there are 156.25 Bits per Timeslot, each Bit being 3.69231 us long.

CDMA—(Code Division Multiple Access)

Unlike the other digital systems that divide the spectrum into different time slots, CDMA's spread spectrum technique overlaps every transmission on the same carrier frequency by assigning a unique code to each conversation. The often-used analogy for this is your ability to detect your own language in a room full of people speaking other languages.

Path Loss

As the transmitted signal traverses the atmosphere its power level decreases at a rate inversely proportional to the distance traveled and proportional to the wavelength of the signal. Disregarding the desperation by the atmosphere and only considering the diminishing voltage, the path loss can be calculated by $$\text{Path Loss} = 20 = \text{Log}_{10}\left[\frac{4*\pi*d}{\lambda}\right]\{dB\},$$

where $$\left|\begin{array}{l} d = \text{distance\{same units as } \lambda\} \\ \lambda = \text{wavelength\{same units as } d\} \end{array}\right|$$

Figure 4:
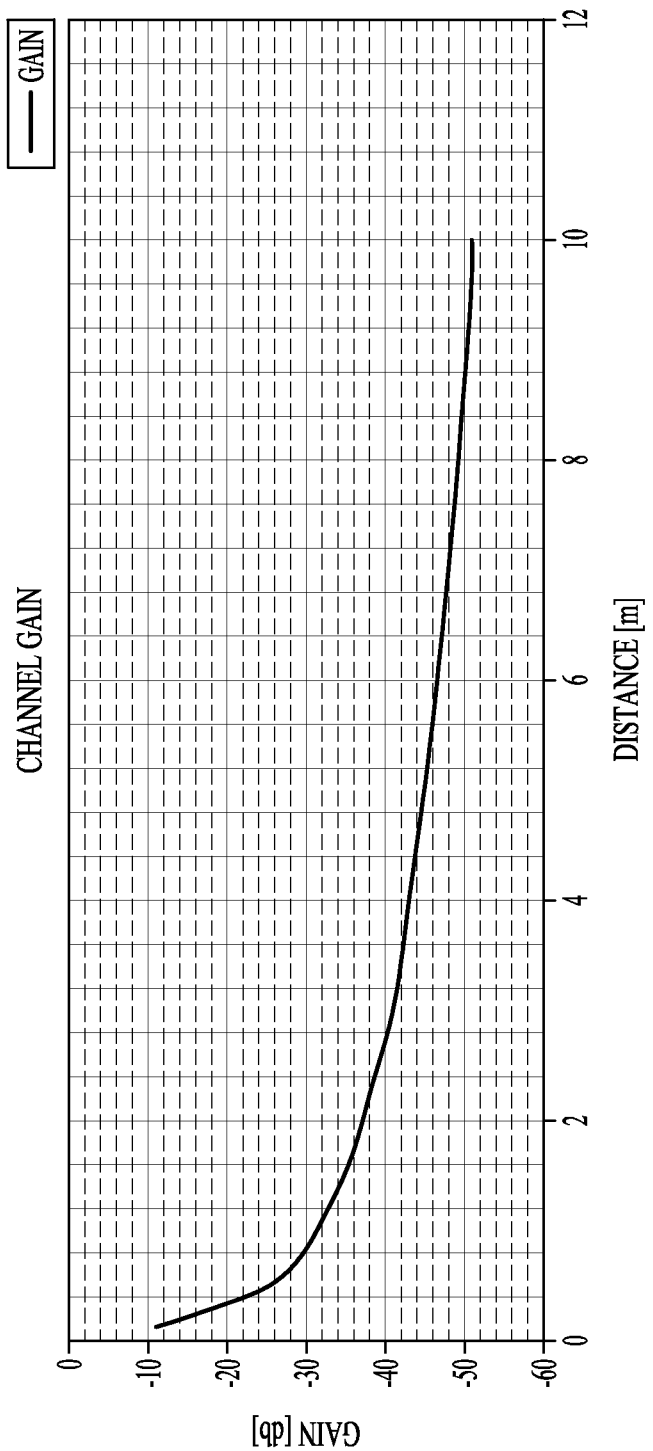
FIG. 4 shows a graphical representation of channel gain versus distance for a transmitted signal in a communication system.

From the formula, it can be seen that when the distance (d) is equal to $\frac{1}{4}\pi$, path loss is calculated as 0 dB. If the wavelength is given in meters, then path loss is calculated as 0 dB at 7.96 cm. FIG. 4 shows a graphical representation of channel gain versus distance for a transmitted signal in a communication system.

Fading

Fading refers to the distortion that a carrier-modulated telecommunication signal experiences over certain propagation me A fading channel is a communication channel that experiences fading.

Types of Fading

Slow fading arises when the coherence time of the channel is large relative to the delay constraint of the channel. In this regime, the amplitude and phase change imposed by the channel can be considered roughly constant over the period of use.

Fast fading occurs when the coherence time of the channel is small relative to the delay constraint of the channel. In this regime, the amplitude and phase change imposed by the channel varies considerably over the period of use. FIG. 5 shows a graphical representation of a channel fading in a communication system, illustrating both slow and fast fading.

In flat fading, the coherence bandwidth of the channel is larger than the bandwidth of the signal. Therefore, all frequency components of the signal will experience the same magnitude of fading.

In frequency-selective fading, the coherence bandwidth of the channel is smaller than the bandwidth of the signal. Different frequency components of the signal therefore experience decorrelated fading.

System for Detecting a Cell Phone Using a Hearing Assistance Device

The present subject matter provides for changing the hearing assistance device's mode of operation to a magnetic mode by detecting the RF signal transmitted by the cell phone antenna, instead of the weak magnetic field generated by the cell phone speaker. The depicted embodiments focus on the GSM 850 and GSM 1900 systems that are used in the US, but with minor modification can easily be extended to the GSM 900 or GSM 1800 or other cellular telephone communication systems, without departing from the scope of this disclosure.

FIG. 6 shows a graphical representation of a frequency allocation for GSM 850 (602) and GSM 1900 (612) cellular telephone communication systems. GSM-850 uses 824-849 MHz to send information from the mobile station to the base station (uplink 604) and 869-894 MHz for the other direction (downlink 606). This corresponds to channel numbers 128 to 251. GSM-1900 uses 1850-1910 MHz to send information from the mobile station to the base station (uplink 614) and 1930-1990 MHz for the other direction (downlink 616). This corresponds to channel numbers 512 to 810.

Detection

FIG. 7 illustrates a graphical representation of filtering the uplink frequency of GSM 850 and GSM 1900 cellular telephone communications, according to various embodiments of the present subject matter. As stated above, since the primary goal is to detect a cell phone using the RF signal transited from it, the detection system should be able to discriminate all RF signal outside the up-link frequency ranges. These can be accomplished by using two band-pass filters (702, 704) with corner frequencies of 824 MHz (701) and 849 MHz (703) for the GSM 850 case and 1850 MHz (711) and 1910 MHz (713) for the GM 1900 case.

Once the up-link frequencies are selected by the band pass fitters, the next stage of the detection circuits determines the average signal strength over the up-link bandwidth. The output of this stage is connected to the GPIO (General Purpose Input Output) pin of the hearing assistance device's processor. The processor constantly monitors this input and when a significant increase in the average signal strength is detected, the processor sends out a tune signal to the RF transceiver (which already exits in the haring assistance device) to scan through all the channel frequencies. During this process, the microcontroller monitors and averages out the RSSI (Received Signal Strength Indicator) output of the transceiver at each frequency in the up-link bandwidth and if the signal strength at any frequency is higher than the detect-level (a level set by a different algorithm discussed below), the processor locks the transceiver at that particular frequency and monitors if the signal strength stays at that level within a given threshold. This is done to avoid false triggering. If the strength stays with the threshold for a few milliseconds, in an embodiment, the processor changes the hearing assistance device's mode of operation to magnetic mode.

Setting the Detect-Level

Since there could be many other cell phone users around a person wearing a hearing, the detection system has accurate methods to detect the cell phone which is only few centimeters from it. Different scenarios with the proposed solution are given below.

The transmitting power of a cell phone varies depending on its distance from the base station. The closer a cell phone is to the base station, the weaker is its transmission power and vice versa. This makes it challenging to pick a particular level as a minimum detect-level. To make this clearer we can assume a worst case in which there are two cell phones that are very far from the base station but only 3 meters away from each other.

In this situation, both cell phones are transmitting at full power to maintain communication with the base station, but, since they are only 3 meters apart, the signal from one is very strong at the antenna of the other. If we assume that a person wearing a hearing assistance device is using one of these cell phones, he could easily get a false detection from the other cell phone.

To effectively solve the problem stated in this scenario, besides the signal strength of the uplink bandwidth, the detection system also monitors the signal strength in the downlink bandwidth. At regular intervals, the microcontroller sends out a tune signal to the transceiver in the downlink bandwidth, reads back and averages out the RSSI. This way, the detection system learns the base station's signal strength and, since, the cell phone's transmission power is inversely proportional to the base station's power at a given location, the detect-level can be set accordingly. Strong base station signal strength implies lower detect-level and vice versa.

Fast Fading

Another scenario that needs consideration is fast fading. The signal strength of the base station that is being used to set the minimum detect-level could vary considerably over the period of use.

The solution here is to have the detection system constantly monitor the signal strength and re-calculate the average through time. If the average goes down, then it increases the detect-level.

Handover

Another scenario that needs consideration is handover. If the cell phone user, whose hearing assistance device cell phone detector is locked to one channel, is handed over to a next cell, the RSSI at the locked frequency drops because that channel doesn't exist in the adjacent cells. If the detection system doesn't have an algorithm to handle this situation, it might think that the cell phone is disconnected or taken away from the hearing assistance device's vicinity and switches the mode back to acoustic mode.

The solution to the handover scenario involves another scan to locate the next base station. When the RSSI at the locked frequency drops, the detection circuit scans through the down-link circuit to recalculate the detect-level and scans through the up-link bandwidth to see if there is another channel with signal strength above the detect level. If it finds one, it locks to this channel repeating the routines stated in the solutions (1) and (2) above. Otherwise it changes the mode to acoustic assuming one of the following: 1. the cell phone is disconnected; 2. the cell phone is taken away from the vicinity; or 3. No service in that area.

Figure 8:
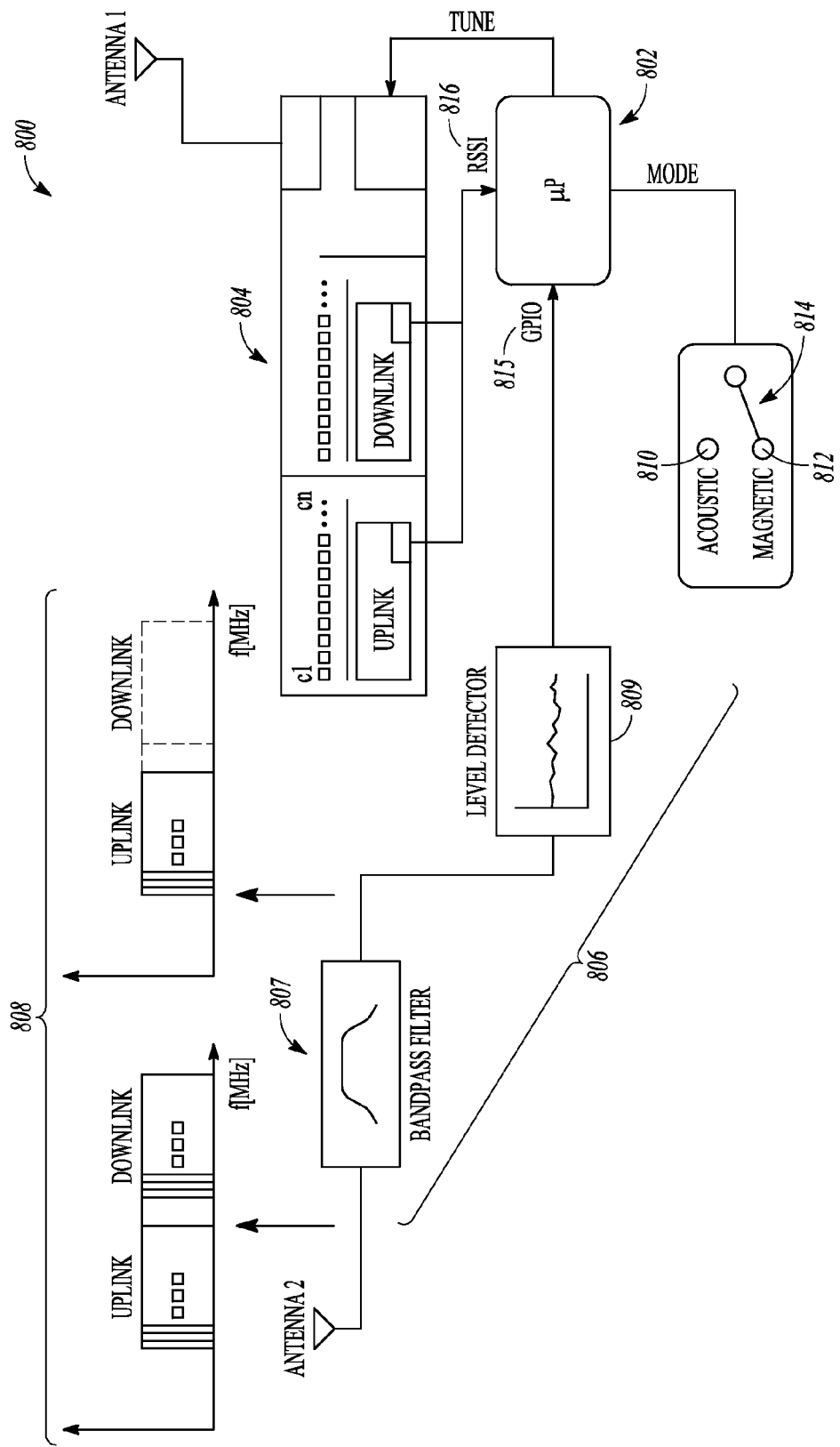
FIG. 8 illustrates a block diagram of a system for detecting cellular telephones using hearing assistance devices, according to various embodiments of the present subject matter.

FIG. 8 illustrates a block diagram of a system for detecting cellular telephones using hearing assistance devices, according to various embodiments of the present subject matter. In an embodiment, a hearing assistance device 800 includes a processor 802 and a radio frequency transceiver 804 connected to the processor. A detection circuit 806 is connected to the processor, where the detection circuit 806 is adapted to monitor a radio frequency signal 808 to detect a cellular telephone in proximity to the hearing assistance device based on the monitored signal. In various embodiments, the hearing assistance device includes an acoustic input 810, a magnetic input 812, and a switch 814 for selecting between the acoustic input and the magnetic input. The processor 802 is adapted to actuate the switch from the acoustic input to the magnetic input when a cellular telephone is detected in proximity to the hearing assistance device.

According to various embodiments, the detection circuit 806 includes a band pass filter 807. The band pass filter 807 has corner frequencies set to include uplink frequency bandwidth for the cellular telephone. The detection circuit 806 includes a level detector 809, in various embodiments. In an embodiment, the detection circuit 806 is adapted to determine average signal strength over the uplink frequency bandwidth and produce a detection circuit output. The detection circuit output is connected to a general purpose input output (GPIO) pin 815 of the processor. In various embodiments, the processor 802 is adapted to monitor the GPIO input and send a tune signal to the radio frequency transceiver when a significant increase in the average signal strength is detected. The processor 802 is adapted to monitor a received signal strength indicator (RSSI) output 816 of the transceiver, in various embodiments. It is understood that the configuration shown in FIG. 8 is demonstrative and is not intended in an exhaustive or exclusive sense. Other configurations may exist without departing from the scope of the present subject matter.

Using the above discussed method, if the hearing assistance device detects a strong RF signal, it switches to a magnetic mode. In this mode, the hearing assistance device is configured to have the required gain, sensitivity and other hearing assistance device parameter settings that are suitable to pick up the magnetic audio emitted by the cell phone's speaker. When the cell phone is moved away from the hearing assistance device, the detection circuit sets the operational mode back to acoustic mode and resets the setting accordingly.

Figure 9:
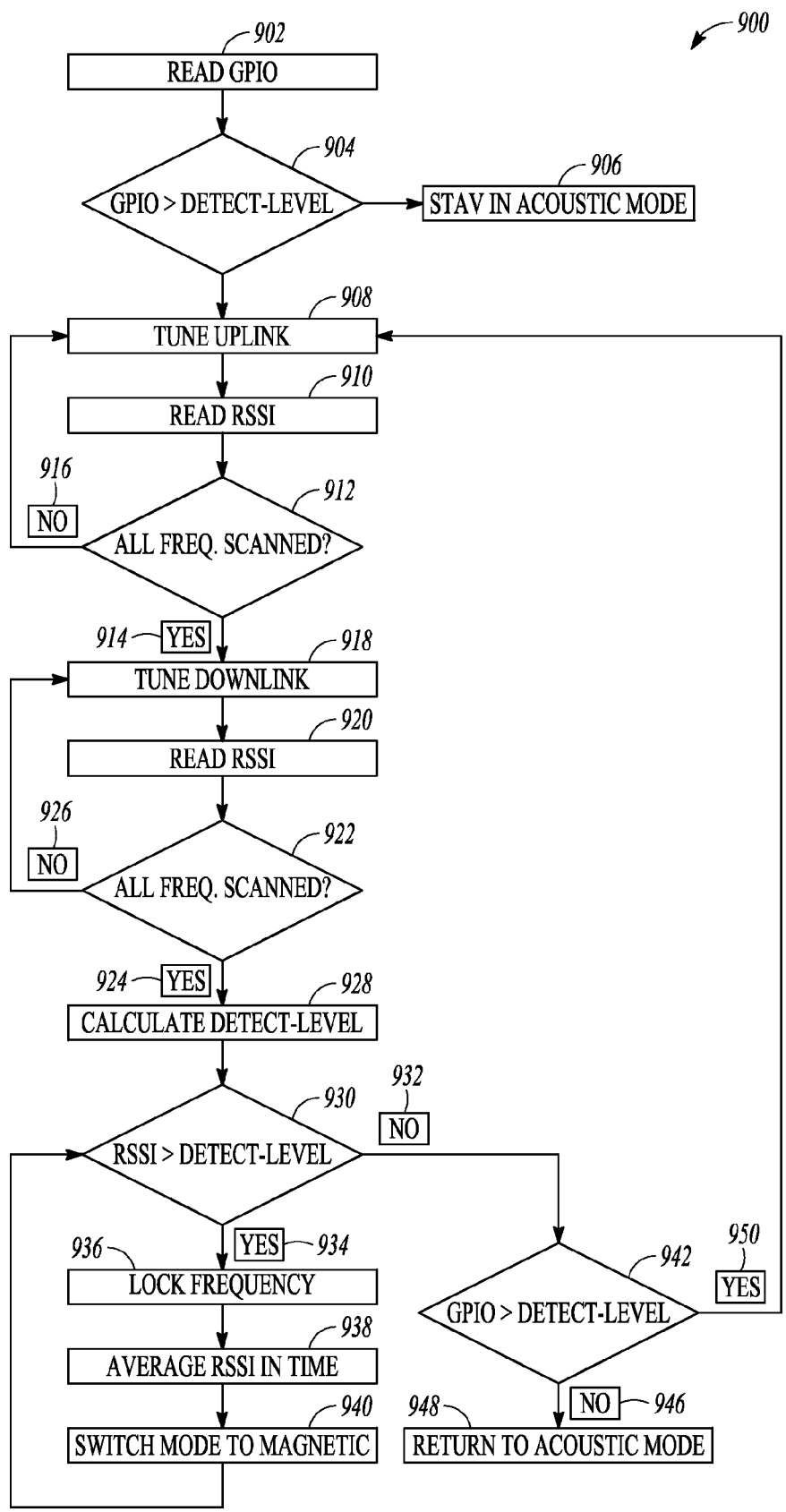
FIG. 9 illustrates a flow diagram of a method for detecting cellular telephones using hearing assistance devices, according to various embodiments of the present subject matter.

FIG. 9 illustrates a flow diagram of a method 900 for detecting cellular telephones using hearing assistance devices, according to various embodiments of the present subject matter. The method 900 is an embodiment of the control flow that should be programmed in to the existing hearing assistance device's processor and transceiver. The processor reads the GPIO input at 902 and compares it to a detect level at 904. If the GPIO input level is less than the detect level, the hearing assistance device remains in acoustic mode at 906. If the GPIO input level is greater than the detect level, the uplink is tuned at 908 by reading the RSSI input at 920. The processor checks if all frequencies have been scanned at 922, if not (926) the process is repeated. If all frequencies have been scanned 924, a detect level is calculated at 928. The RSSI is then compared to the detect level at 930. If the RSSI is greater than the detect level at 934, a cell phone has been detected and the frequency is locked at 936, RSSI is averaged in time at 938, and the hearing assistance device mode is switched to magnetic at 940, while the RSSI is monitored at 930 to ensure the cell phone is still in proximity. If the RSSI is not greater than the detect level 932, GPIO level is compared to the detect level at 942. If the GPIO level is not greater than the detect level at 946, the cell phone is no longer in proximity and the hearing assistance device is returned to acoustic mode at 948. If the GPIO level is greater than the detect level at 950, the cell phone is in communication with a different base station and uplink is tuned at 908.

One embodiment of the present subject matter is a method including monitoring a radio frequency signal using an electronic circuit in a hearing assistance device, and detecting a cellular telephone in proximity to the hearing assistance device based on the monitored signal. The hearing assistance device is switched from an acoustic mode of operation to a magnetic mode of operation when the cellular telephone is detected in proximity to the hearing assistance device. According to various embodiments, detecting a radio frequency signal using an electronic circuit includes detecting the radio frequency signal using a band pass filter. Corner frequencies for the band pass filter are set to include uplink frequencies for the cellular telephone, in various embodiments. Corner frequencies are set to 824 MHz and 849 MHz for a GSM (Global System for Mobile communication) 850 system embodiment, or to 1850 MHz and 1910 MHz for a GSM 1900 system embodiment.

Another embodiment of the present subject matter is a method for using an electronic circuit in a hearing assistance device to detect a cellular telephone in proximity to the hearing assistance device, the cellular telephone in communication with a base station. The method includes monitoring signal strength in a downlink bandwidth of the cellular telephone using the electronic circuit to determine the signal strength of the base station. A power detect level is set based on the signal strength of the base station. Signal strength in an uplink bandwidth of the cellular telephone is monitored using the electronic circuit, and the cellular telephone is detected in proximity to the hearing assistance device when the signal strength in the uplink bandwidth meets or exceeds the power detect level. According to various embodiments, the method further includes switching the hearing assistance device from an acoustic mode of operation to a magnetic mode of operation when the cellular telephone is detected in proximity to the hearing assistance device. Monitoring signal strength in the uplink bandwidth includes calculating average through time to detect fast fading, in an embodiment. The power detect level is increased if the average through time decreases by a prescribed amount. The method further includes continued monitoring of signal strength in the uplink bandwidth to detect whether the cellular telephone is communicating with the base station, in an embodiment. If the cellular telephone is no longer communicating with the base station, the uplink bandwidth is searched to determine if the cellular telephone is communicating with a second base station (handoff).

Modem hearing assistance devices are getting smaller in size and weight. Therefore, the detection circuit is limited in dimensions, in various embodiments. Another constraint in the hearing assistance device is power supply level. All the circuitry in a hearing assistance device is supplied by a small battery in the range of 1.25 to 1.4 V and the added detection circuit in the hearing assistance device cannot significantly increase the drain. A third challenge is the limitation in the processing power of the processor. An additional routine to the processor to detect a cell phone could potentially slow down the processor and potentially the audio processing of the hearing assistance device. The existence of many different cell phone systems simultaneously in the markets and the different frequency allocations around the world must also be factored. A simulation to overcome implementation issues includes a full simulation of the TDMA system using both the uplink and down link frequencies and monitoring the output of the level detector using Matlab's Simulink. The simulation further includes empirical measurement of base station and cell phone signal strengths at different locations and environmental conditions, design and simulation of the bandwidth filters for frequencies in the uplink and downlink bandwidth using PSPICE software program that simulates the hearing assistance devices processor, building the actual physical circuit based on the simulation results and testing it using a physical signal and instrumentation, and actual implementation of the circuit in the hearing assistance device and testing it in a real life situation.

Figure 10A:
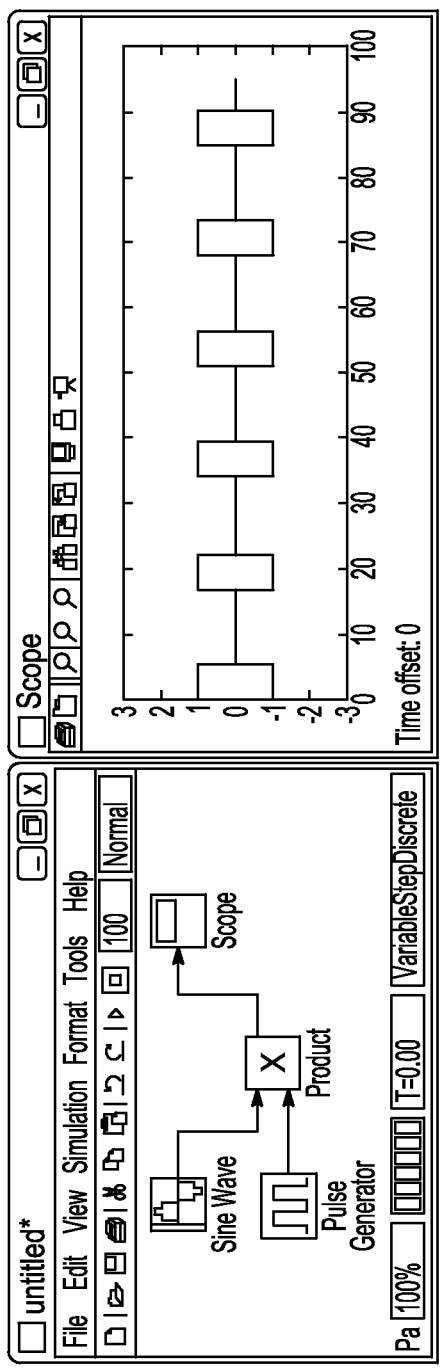
FIGS. 10A-10C illustrate a simulation model for generating test signals for detecting cellular telephones using hearing assistance devices, according to various embodiments of the present subject matter.
Figure 10B:
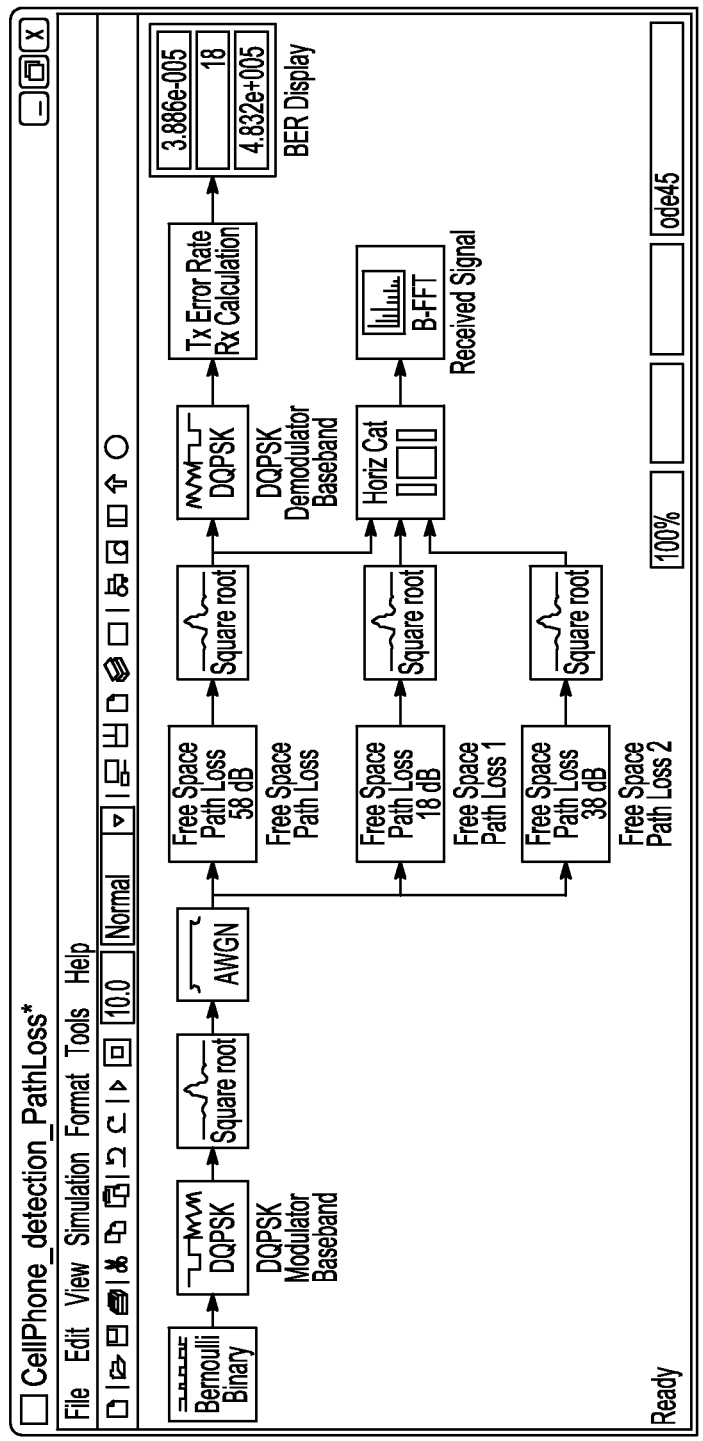
Figure 10C:
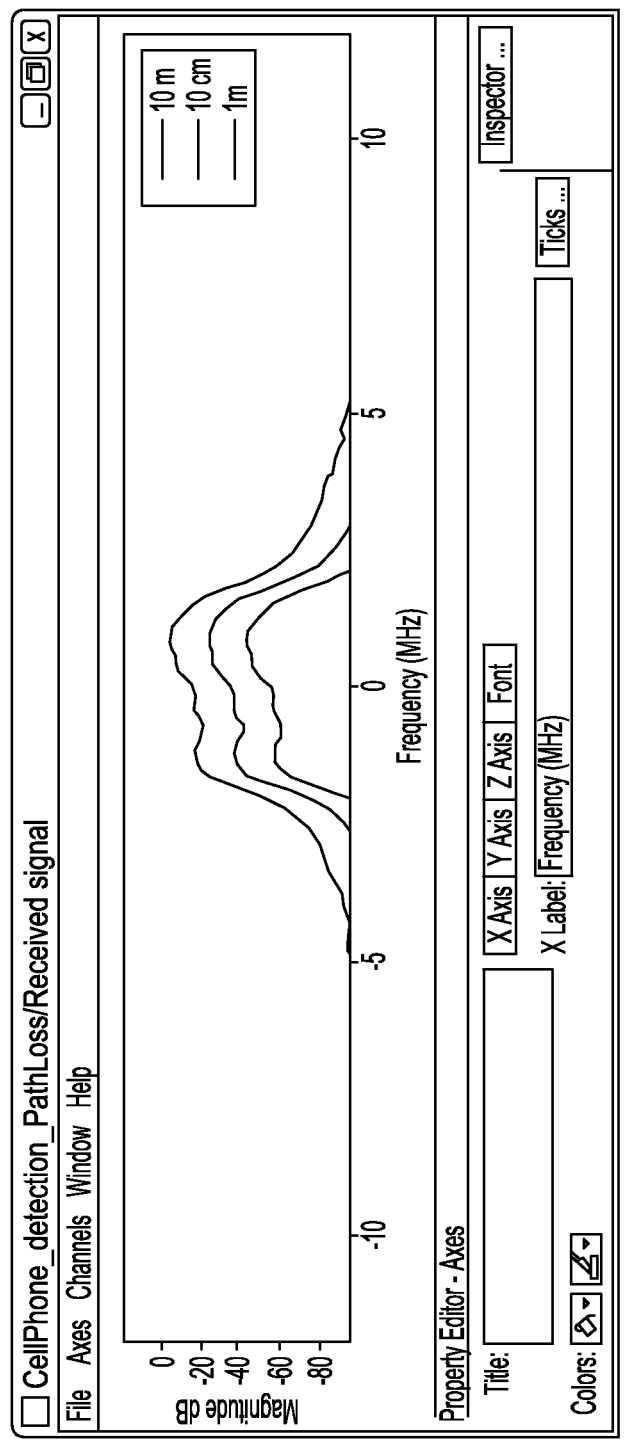

FIGS. 10A-10C illustrate a simulation model for generating test signals for detecting cellular telephones using hearing assistance devices, according to various embodiments of the present subject matter. The TDMA uplink signal is generated for simulation using the Simulink block shown in FIG. 10A. The free path loss of the communication channel is modeled as shown in FIG. 10B using Simulink. The free path loss at 10 cm, 1 m and 10 m is shown in the graphical representation of FIG. 10C. From the simulation result of the above Simulink block, it can be seen that the transmitter signal strength, in this case the cell phone, reduces by a significant amount of approximately 20 db when the cell phone is moved from a 10 cm to a 1 meter distance away from the hearing assistance device. This illustrates that, if the average signal strength of the base station is calculated with a reasonable accuracy, there is enough margin to set a minimum detection level to discriminate other interfering cell phones near by the hearing assistance device.

The present subject matter is demonstrated using hearing assistance devices, including but not limited to, behind-the-ear (BTE), in-the-ear (ITE), in-the-canal (ITC), or completely-in-the-canal (CIC) type hearing aids. It is understood that behind-the-ear type hearing assistance devices may include devices that reside substantially behind the ear or over the ear. Such devices may include hearing assistance devices with receivers associated with the electronics portion of the behind-the-ear device, or hearing assistance devices of the type having receivers in the ear canal of the user. Such devices are also known as receiver-in-the-canal (RIC) or receiver-in-the-ear (RITE) hearing instruments. The present subject matter can also be used in hearing assistance devices generally, such as cochlear implant type hearing devices. It is understood that other hearing assistance devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A hearing assistance device, comprising:
a processor;
a radio frequency transceiver connected to the processor;
an acoustic input;
a magnetic input; and
a detection circuit connected to the processor, the detection circuit including multiple band pass filters configured for uplink and downlink frequencies associated with cellular communications, and wherein the detection circuit is adapted to monitor a radio frequency signal to detect a cellular telephone in proximity to the hearing assistance device based on the monitored signal,
wherein the processor is configured to switch between the acoustic input and the magnetic input when the cellular telephone is detected in proximity to the hearing assistance device using the detection circuit.

2. The hearing assistance device of claim 1, wherein the detection circuit includes a level detector.

3. The hearing assistance device of claim 1, wherein the detection circuit is adapted to determine average signal strength over the uplink frequency bandwidth and produce a detection circuit output.

4. The hearing assistance device of claim 1, wherein the detection circuit is connected to a general purpose input output (GPIO) pin of the processor.

5. The hearing assistance device of claim 4, wherein the processor is adapted to monitor the GPIO input and send a tune signal to the radio frequency transceiver when a significant increase in the average signal strength is detected.

6. The hearing assistance device of claim 1, wherein the hearing assistance device includes a cochlear implant.

7. The hearing assistance device of claim 1, wherein the hearing assistance device includes a hearing aid.

8. The hearing assistance device of claim 7, wherein the hearing aid includes an in-the-ear (ITE) hearing aid.

9. The hearing assistance device of claim 7, wherein the hearing aid includes a behind-the-ear (BTE) hearing aid.

10. The hearing assistance device of claim 7, wherein the hearing aid includes an in-the-canal (ITC) hearing aid.

11. The hearing assistance device of claim 7, wherein the hearing aid includes a receiver-in-canal (RIC) hearing aid.

12. The hearing assistance device of claim 7, wherein the hearing aid includes a completely-in-the-canal (CIC) hearing aid.

13. The hearing assistance device of claim 7, wherein the hearing aid includes a receiver-in-the-ear (RITE) hearing aid.

14. A method, comprising:
providing a hearing assistance device including a portion configured to be worn in an ear of a wearer, the hearing assistance device including a processor, a detection circuit, an acoustic input and a magnetic input; and
switching from the acoustic input to the magnetic input using the processor when the detection circuit detects a cellular telephone in proximity to the hearing assistance device, including detecting a radio frequency signal in a programmable bandwidth that meets or exceeds a programmable power level for a programmable duration.

15. The method of claim 14, wherein the processor includes a digital signal processor (DSP).

16. The method of claim 14, wherein the programmable bandwidth includes a band pass filter configured to include uplink frequencies associated with cellular telephone communications.

17. The method of claim 16, including setting corner frequencies for the band pass filter to 824 MHz and 849 MHz for a GSM (Global System for Mobile communication) 850 system.

18. The method of claim 16, including setting corner frequencies for the band pass filter to 1850 MHz and 1910 MHz for a GSM 1900 system.

19. The method of claim 14, wherein the hearing assistance device includes a cochlear implant.

20. The method of claim 14, wherein the hearing assistance device includes a hearing aid.

21. The method of claim 20, wherein the hearing aid includes an in-the-ear (ITE) hearing aid.

22. The method of claim 20, wherein the hearing aid includes a behind-the-ear (BTE) hearing aid.

23. The method of claim 20, wherein the hearing aid includes an in-the-canal (ITC) hearing aid.

24. The method of claim 20, wherein the hearing aid includes a receiver-in-canal (RIC) hearing aid.

25. The method of claim 20, wherein the hearing aid includes a completely-in-the-canal (CIC) hearing aid.

26. The method of claim 20, wherein the hearing aid includes a receiver-in-the-ear (RITE) hearing aid.

* * * * *